United States Patent
Shrivastava et al.

(10) Patent No.: US 11,290,863 B2
(45) Date of Patent: Mar. 29, 2022

(54) SYSTEM AND METHOD FOR DISCOVERING USER EQUIPMENT (UE) OVER SIDE LINK IN DEVICE TO DEVICE (D2D) COMMUNICATION

(71) Applicant: Samsung Electronics Co., Ltd., Suwon-si (KR)

(72) Inventors: Vinay Kumar Shrivastava, Bangalore (IN); Piyush Makhija, Bangalore (IN); Raghavendra Murali, Bangalore (IN); Rohan Raj, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 519 days.

(21) Appl. No.: 16/319,563

(22) PCT Filed: Jul. 19, 2017

(86) PCT No.: PCT/KR2017/007794
§ 371 (c)(1),
(2) Date: Jan. 22, 2019

(87) PCT Pub. No.: WO2018/016882
PCT Pub. Date: Jan. 25, 2018

(65) Prior Publication Data
US 2021/0297842 A1  Sep. 23, 2021

(30) Foreign Application Priority Data

Jul. 21, 2016 (IN) .............................. 201641025050
Jul. 3, 2017 (IN) .............................. 201641025050

(51) Int. Cl.
*H04W 4/00* (2018.01)
*H04W 8/00* (2009.01)
(Continued)

(52) U.S. Cl.
CPC ............. *H04W 8/005* (2013.01); *H04W 4/70* (2018.02); *H04W 28/0284* (2013.01); *H04W 28/24* (2013.01); *H04W 76/28* (2018.02)

(58) Field of Classification Search
CPC ... H04W 8/005; H04W 28/0284; H04W 4/70; H04W 28/24; H04W 76/28
(Continued)

(56) References Cited

U.S. PATENT DOCUMENTS 10,531,365 B2 * 1/2020 Kaur ..................... H04W 24/04
2011/0237231 A1 9/2011 Horneman et al.
(Continued)

FOREIGN PATENT DOCUMENTS

| CN | 102204392 A | 9/2011 |
| CN | 105379406 A | 3/2016 |

(Continued)

OTHER PUBLICATIONS

International Search Report PCT/ISA/210 for International Application No. PCT/KR2017/007794 dated Oct. 24, 2017.
(Continued)

*Primary Examiner* — Mark G. Pannell
(74) *Attorney, Agent, or Firm* — Harness, Dickey & Pierce, P.L.C.

(57) ABSTRACT

The various embodiments of the present invention disclose a system and method for discovering User Equipment's over side link in device to device (D2D) communication. The present invention discloses new approaches for discovery and communication scheduling enabling optimum system performance with DRX alignment and meeting varied QoS targets. The present invention further addresses congestion handling during system overload situations. Further, the present invention discloses quality of service (QoS) sched-
(Continued)

uling methods that consider DRX function achieve substantial gains over existing methods.

20 Claims, 8 Drawing Sheets (51) Int. Cl.
*H04W 4/70* (2018.01)
*H04W 76/28* (2018.01)
*H04W 28/02* (2009.01)
*H04W 28/24* (2009.01)

(58) Field of Classification Search
USPC .......................................................... 370/329
See application file for complete search history.

(56) References Cited

U.S. PATENT DOCUMENTS

| | | |
|---|---|---|
| 2011/0258327 A1 | 10/2011 | Phan et al. |
| 2012/0230247 A1 | 9/2012 | Kwon et al. |
| 2013/0229931 A1 | 9/2013 | Kim |
| 2014/0135019 A1 | 5/2014 | Jang et al. |
| 2014/0171062 A1 | 6/2014 | Fallgren et al. |
| 2015/0029866 A1* | 1/2015 | Liao .................. H04W 52/0216 370/241 |
| 2015/0326738 A1* | 11/2015 | Li ........................... H04W 4/24 455/406 |
| 2016/0044740 A1 | 2/2016 | Siomina et al. |
| 2016/0227518 A1 | 8/2016 | Li et al. |
| 2016/0330604 A1* | 11/2016 | Kim ...................... H04W 72/10 |
| 2016/0345169 A1* | 11/2016 | Wifvesson .............. H04L 63/06 |
| 2017/0006651 A1* | 1/2017 | Jung ..................... H04W 48/16 |
| 2017/0201934 A1* | 7/2017 | Kim ....................... H04W 8/005 |
| 2017/0238359 A1* | 8/2017 | Atarius ................ G01S 7/4817 370/259 |
| 2017/0244468 A1 | 8/2017 | Zhao |
| 2017/0251029 A1* | 8/2017 | Atarius ............... H04L 65/4061 |
| 2017/0257751 A1* | 9/2017 | Atarius ................... H04W 4/70 |
| 2017/0279858 A1* | 9/2017 | Atarius .................... H04L 12/18 |
| 2017/0288886 A1* | 10/2017 | Atarius ............... H04L 65/1063 |
| 2017/0339671 A1* | 11/2017 | Lee ........................ H04W 72/12 |
| 2017/0359186 A1* | 12/2017 | Atarius ................. H04M 15/61 |
| 2017/0374109 A1* | 12/2017 | Atarius ............... H04L 65/1016 |
| 2018/0014262 A1* | 1/2018 | Lee ........................ H04W 52/30 |
| 2018/0019904 A1* | 1/2018 | Lee ........................ H04W 56/00 |
| 2018/0077552 A1* | 3/2018 | Lee ........................ H04W 72/12 |
| 2018/0077746 A1* | 3/2018 | Lee ........................ H04W 72/08 |
| 2018/0092017 A1* | 3/2018 | Freda .................... H04W 76/23 |
| 2018/0124707 A1* | 5/2018 | Lee ................... H04W 72/0406 |
| 2018/0152234 A1* | 5/2018 | Huang ................... H04L 63/20 |
| 2018/0192280 A1* | 7/2018 | Kuge .................... H04W 12/06 |
| 2018/0234827 A1* | 8/2018 | Stojanovski ...... H04W 12/0433 |
| 2019/0387429 A1* | 12/2019 | Basu Mallick ....... H04W 40/04 |
| 2021/0029585 A1* | 1/2021 | Bharadwaj ............ H04W 72/02 |

FOREIGN PATENT DOCUMENTS

| | | |
|---|---|---|
| CN | 105451282 A | 3/2016 |
| CN | 105594293 A | 5/2016 |
| WO | WO-2014/176408 A1 | 10/2014 |
| WO | WO-2015047167 A1 | 4/2015 |
| WO | WO-2016099227 A1 | 6/2016 |

OTHER PUBLICATIONS

Written Opinion of the International Searching Authority PCT/ISA/237 for International Application No. PCT/KR2017/007794 dated Oct. 24, 2017.
Chinese Office Action and Search Report dated Mar. 3, 2021, for corresponding Chinese Patent Application No. 201780044716.3.
Chinese Office Action dated Sep. 15, 2021 for corresponding Chinese Patent Application No. 201780044716.3.

* cited by examiner

SYSTEM AND METHOD FOR DISCOVERING USER EQUIPMENT (UE) OVER SIDE LINK IN DEVICE TO DEVICE (D2D) COMMUNICATION

CROSS-REFERENCE TO RELATED APPLICATIONS

This application claims priority to Indian Provisional Patent Application Serial No. 201641025050 filed on Jul. 21, 2016, in the Indian Intellectual Property Office, and to Indian Complete Patent Application Serial No. 201641025050 filed on Jul. 3, 2017 in the Indian Intellectual Property Office, the entire disclosure of each of which is incorporated herein by reference.

1. TECHNICAL FIELD

The present invention generally relates to wireless communication and more particularly, to a system and method for discovering user equipment (UE) over side link relay in device to device (D2D) communication.

2. DISCUSSION OF THE RELATED ART

Long term evolution (LTE) side-link (Device to device communication, D2D), also called as ProSe (Proximity Service) Relay, is being studied and developed in 3GPP standard workgroups at present. It is aimed at equipping LTE to cater to critical communication services like public safety services like MC-PTT (Mission Critical Push to Talk) or GSCE (Group communication System Enablers) services as well as infotainment broadcast services like MBMS (Multimedia Broadcast Multicast services) providing audio/video streaming or text/data based services. It is directed to extend the coverage area e.g. serving UEs (User Equipment) that are located outside of network coverage, also called Remote UEs (These UEs may still be in coverage of networks other than ProSe networks being discussed). In general, these remote UEs are connected to the ProSe networks through another UE called Relay UE which is in coverage of ProSe network. Thereby, Relay UE provides an indirect link to the Remote UEs to the network. Relay UE may be connected to the network by at least one of the multitude of the air interface techniques like cellular LTE, Multicast-broadcast single-frequency network (MBSFN), wireless local area network (WLAN), etc. whereas, it communicates with the Remote UEs with side-link communication (i.e. D2D link).

Figure 1:
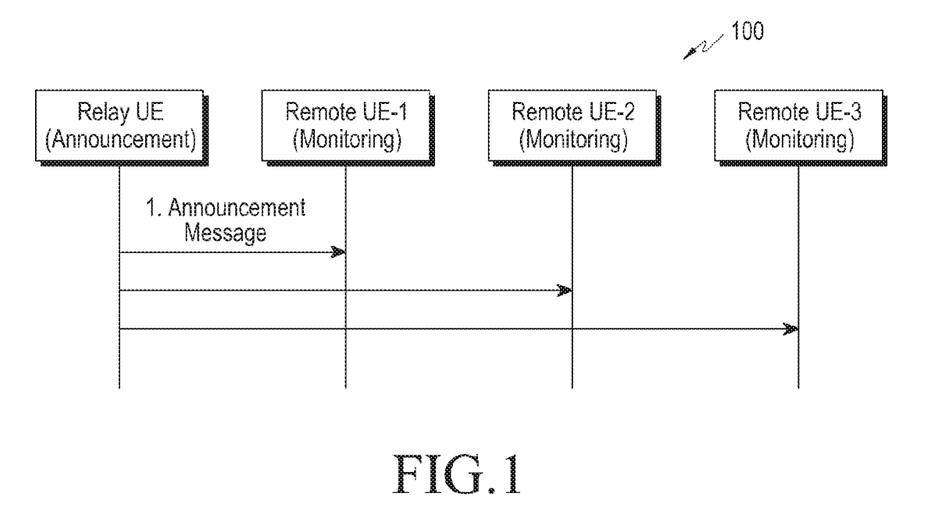
FIG. 1 is a schematic flow diagram illustrating Type-1 Discovery mechanism for ProSe Relay, according to an existing art.

Establishment and maintenance of side-link communication involves many procedures. FIG. 1 is a schematic flow diagram illustrating Type-1 Discovery mechanism for ProSe Relay, according to an existing art. According to the FIG. 1, first of all Remote UE needs to discover the Relay UE which can provide its service of interest. For this purpose, a remote UE can monitor the periodical announcements being made by the Relay UE and accordingly get associated with the Relay UE based on the sufficient signal conditions of the link.

Figure 2:
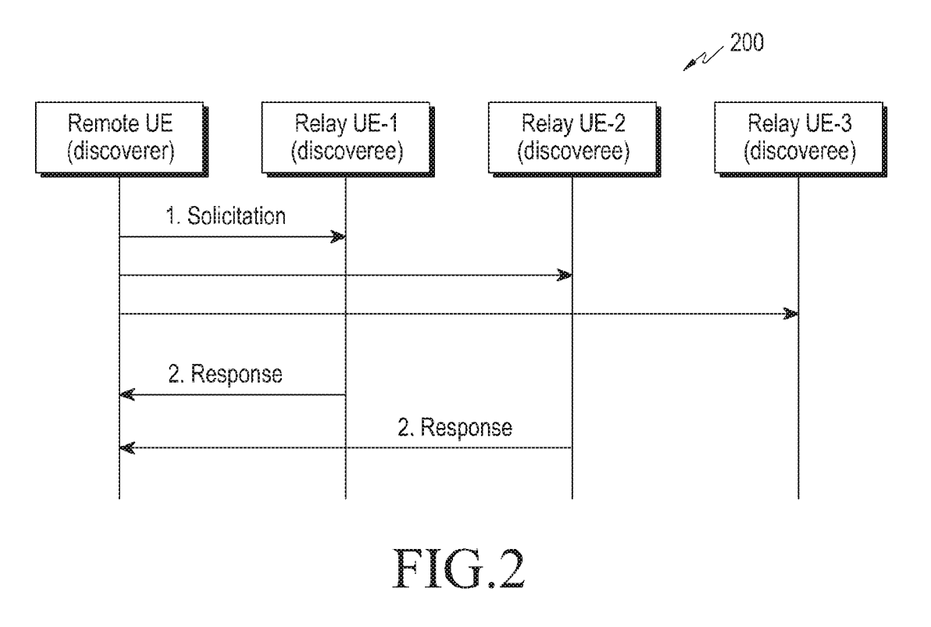
FIG. 2 is a schematic flow diagram illustrating Type-2 Discovery Mechanism, according to an existing art.

FIG. 2 is a schematic flow diagram illustrating Type-2 Discovery Mechanism, according to an existing art. According to the FIG. 2, a Remote UE sends a solicitation messages and based on response of the Relay UE gets associated with it after determining signal conditions are adequate.

Once getting associated a Layer-2 Link is established between the Remote and Relay UE for one-to-one ProSe Direct Communication, wherein data transmissions and reception between Remote UE and Relay UE takes place. Also, at the same time Remote UE keeps monitoring the signal conditions of the link to ensure connectivity. In case of deterioration of the link, it may start searching for a different Relay; this process is called Relay reselection.

Figure 3:
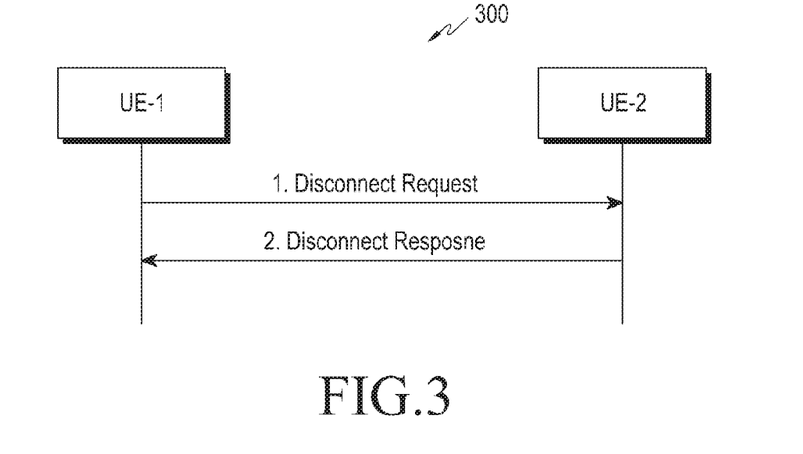
FIG. 3 is a schematic flow diagram illustrating disconnect procedure, according to an existing art.

FIG. 3 is a schematic flow diagram illustrating disconnect procedure, according to an existing art. According to the FIG. 3, after the necessary communications over the sidelink channel are completed the Remote UE or Relay UE can release the Layer-2 Link by sending the Disconnect Request Sidelink message.

Many potential issues are noticed with the existing system and procedures for LTE Side-link Relay communication. One of the problems being addressed in this invention is how to optimize the energy efficiency by reducing the power consumption at the prose Network-to-UE Relay (also called Relay) and Remote UEs. The power consumption depends on multiple factors—number of remote UEs being served, DRX cycle of the relay and remote UE and the delay tolerance of the services. The Relay UE's power consumption would increase as the number of remote UEs being served increases, the DRX cycle of the remote UEs hugely differs from each other and from the relay UE and if the delay tolerance of the service is very less, which in turn reduces the energy efficiency of the relay UE. Other aspects and issues involved for LTE side-link Relay communication is about how to aggregate service data pertaining to one or more Remote UEs and how to schedule transmissions with meeting the needed Quality of Service (QoS) for each of the service for each of the Remote UEs involved in Relay communication.

Further, discovery procedure for Relay Networks have been objective in defining procedures for finding Relay UE, but Remote UE discovery/identification is not properly addressed.

Currently, no procedure is present in 3GPP specs to handle congestion on Relay UE, which may get overloaded when catering multiple Remote UEs. Further, service Continuity aspects for remote UEs are not yet addressed in 3GPP specs.

Further, currently, the LTE side-link Relay communication is the 3GPP standard. It does not address the aspects and issues explained aforementioned and resultantly leads to sub-optimum performance of the Relay system including both Relay UE and Remote UEs.

Thus there is a need for a system and method for device to device (D2D) communication with the side-link relay to overcome the higher power consumption and optimize energy efficiency. Further, there is a need for a system and method for enhancing Remote UE identification and discovery procedures while specifying messages and their contents required for such an enhancement. Further, there is a need for a system and method with Congestion Handling Scheme for Relay systems.

Further, there is a need for a system and methods that uses specific procedures catering to the herein above mentioned issues using retry, redirection, load balancing, and the like. Further, there is need for solutions aiming at maintaining a seamless Relay services.

The above mentioned shortcomings, disadvantages and problems are addressed herein and which will be understood by reading and studying the following specification.

SUMMARY

The various embodiments of the present invention disclose a system and method for discovering user equipment (UE) over side link relay in device to device (D2D) communication. According to an embodiment of the present invention, a method for discovering User Equipment (UE) over side link in device to device (D2D) communication, the method comprises steps of receiving, by a relay User Equipment (UE), a solicitation message from a remote User Equipment (UE), wherein the solicitation message comprises of one or more combination of information including an UE identity, QoS Requirements, DRX configuration signals, current transmission power (Tx Pwr), and transmitting, by the relay UE, a device discovery response along with a support status message to the remote UE based on the UE Id in the solicitation message.

In an embodiment of the present invention, the relay UE transmits the device discovery response based on at least one of, but not limited to, QoS/latency bounds supportable, checking if Energy consumption is within threshold for Relay UE if admitting the soliciting remote UE with its Tx_Pwr, number of currently serving remote UEs is under limit, remote UE device type, bandwidth, and the like, without departing from the scope of the invention.

According to an embodiment of the present invention, a method for discovering User Equipment (UE) over side link in device to device (D2D) communication, the method comprises steps of receiving, by a relay User Equipment (UE), a solicitation message from a remote User Equipment (UE), wherein the solicitation message comprises of an UE identity, QoS Requirement i.e. packet delay budget/latency bound, DRX configuration signals, current transmission power (Tx Pwr), determining, by the relay UE, a relay load status as overloaded or congested if the Remote UE is in coverage area and a Type 2 discovery method is used, and responding in Solicitation response message with an overload indication, if the relay load status is overloaded.

In an embodiment of the present invention, in a Type 2 Discovery, the Relay UE responds in Solicitation response message with an overload indication and/or back-off indication or back-off duration value. In an embodiment of the present invention, if the QoS requested by the remote UE is not supported by the Relay UE, the Relay UE indicates the support status as negative.

According to another embodiment of the present invention, a method for discovering User Equipment (UE) over side link in device to device (D2D) communication, the method comprises steps of checking, by a relay UE, the QoS (latency bounds) information in a solicitation message received from one or more remote UEs, scheduling one or more service and remote UE transmissions in priority order based on a latency requirements of the one or more remote UEs, preparing RX scheduling patterns based on the latency requirements, and assigning the RX scheduling patterns to the one or more remote UEs with aligning DRXs between relay and one or more remote UE(s).

According to another embodiment of the present invention, a method for enabling side link relay discovery in device to device (D2D) communication, the method comprises steps of receiving, by one or more relay User Equipment's (UE), a solicitation message transmitted by a remote User Equipment (UE), and transmitting, by the one or more relay UEs which are currently overloaded, a solicitation response message in Type 2 discovery, wherein the solicitation response message comprises of overload status indicating whether the relay UE is overloaded.

In an embodiment of the present invention, the method further comprises of receiving, by one or more remote User Equipment's (UE), an announcement message transmitted by a relay User Equipment (UE) in type 1 discovery, wherein the announcement message comprises of overload status indicating whether the relay UE is overloaded, ignoring, by one or more remote UEs, congestion status if the remote UE is already connected, obtaining, by the one or more remote UEs, PC5 measurements to check if relay reselection criteria meets, abandoning, by one or more remote UEs, selection or reselection of the relay UE if they are interested to connect or trying to connect, and abandoning, by one or more Remote UEs, PC5 measurements for the Relay UE to check for relay reselection criteria.

In another embodiment of the present invention, the method further comprises steps of transmitting, by the one or more Relay UEs, an overload indicator during a Master Information Block (MIB) broadcast indicating whether the UE relay is overloaded or not, and avoiding by the one or more out of coverage remote UEs, sending of the Solicitation Request message to the one or more relay UEs which are overloaded.

In another embodiment of the present invention, the method further comprises of backing off, by the one or more remote UEs, from sending the solicitation request message on receiving the overload indicator from the relay UEs, wherein the back-off duration is pre-provisioned to be selected from a predefined range.

According to an embodiment of the present invention, a method for enabling side link relay discovery in device to device (D2D) communication, the method comprises steps of receiving, by a relay User Equipment (UE), a DRX configuration request from a remote User Equipment (UE) over a PC-5 link, determining, by the relay UE, an optimal DRX configuration for the remote UE, and sending, by the relay UE, the DRX configuration to the remote UE over the PC5 link and ensures no data is transmitted to the remote UE during the DRX period.

In an embodiment of the present invention, the DRX configuration request comprises of, but not limited to, a state indicator, and DRX parameters, without departing from the scope of the invention. In another embodiment of the present invention, the remote UE applies both Unicast and side-link DRX configuration to determine an active DRX period.

In another embodiment of the present invention, the Relay UE determines optimal DRX configuration based on at least one of, but not limited to, alignment for DRX configuration used by the Remote UE and the Relay UE, services and their corresponding scheduling information, providing same DRX config as its own or a sub-set of it based on service needs, QoS/latency bounds of the service, the received configurations from the eNB, selected configuration from a pool of configurations, and the like, without departing from the scope of the invention.

According to another embodiment of the present invention, a method for enabling side link relay discovery in device to device (D2D) communication, the method comprises steps of receiving, by a relay User Equipment (UE), a data set from a network, performing, by the relay UE, data aggregation of transmission data, performing, by the relay UE, a data transmission to a remote UE according to the configured DRX, and receiving, by the relay UE, data transmitted by the remote UE according to the configured DRX.

In an embodiment of the present invention, the Relay UE utilizes the QoS (latency bounds) information received from the Remote UE in deciding how much aggregation and transmission delay can be incurred at Relay UE side and scheduling transmissions for the remote UEs.

According to another embodiment of the present invention, method of disconnecting Comprises steps of sending, by a relay UE, a disconnection request to a remote UE along with a redirection information for switching of remote UE to another Relay User Equipment (UE), and receiving, by the relay UE, a disconnect response from the remote UE.

In an embodiment of the present invention, the relay UE acquires the redirection information that includes redirection information based on SIB19 which out of coverage Remote UEs can utilize.

According to another embodiment of the present invention, a Relay User Equipment (UE) for side-link communication comprising a Remote-Relay Controller (RR controller) adapted for providing RX patterns assignment to remote UE(s) with aligning DRXs between relay and remote UE(s), Traffic identification and differentiation, Service Data aggregation for remote UE(s), and QoS based scheduling transmission. Further, the relay UE comprises of a router module adapted to connect a cellular link to a side-link with a L3 forwarding based approach, a side-link stack adapted for enabling communication with one or more remote User Equipment's (UEs) connected to the relay UE, and an interface technique for connecting the relay UE to the cellular network, where the network interface comprises at least one of, but not limited to, a cellular Long-Term Evolution (LTE) network, Multicast-broadcast single-frequency network (MBSFN), wireless local area network (WLAN), and the like, without departing from the scope of the invention.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

BRIEF DESCRIPTION OF THE DRAWINGS

The other objects, features and advantages will occur to those skilled in the art from the following description of the preferred embodiment and the accompanying drawings in which.

Although specific features of the present invention are shown in some drawings and not in others. This is done for convenience only as each feature may be combined with any or all of the other features in accordance with the present invention.

DETAILED DESCRIPTION

The various embodiments of the present invention disclose a system and method for discovering user equipment (UE) over side link in device to device (D2D) communication. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention provides a system and method for discovering User Equipment (UE) over side link in device to device (D2D) communication. The UE can be any of the electronic communication devices such as, but not limited to, mobile phone, laptop, tablet, PDA, smart watch, smart glasses, and the like. The person having ordinarily skilled in the art can understand that the described embodiments use cases are for better understanding and illustration of the present invention, but not limit to scope of the present invention.

According to an embodiment of the present invention, a method for discovering User Equipment (UE) over side link in device to device (D2D) communication, the method comprises of receiving, by a relay User Equipment (UE), a solicitation message from a remote User Equipment (UE), wherein the solicitation message comprises of one or more combination of information including an UE identity, quality of service (QoS) Requirements, DRX configuration signals, current transmission power (Tx Pwr). During D2D communication, the communication can be established between the relay UE and the remote UE. During D2D communication, the remote UE transmits the solicitation message to the relay UE, wherein the solicitation message comprises of information such as, but not limited to, UE identity (Id), quality of service (QoS) Requirements, DRX configuration signals, current transmission power (Tx Pwr), and the like. The relay UE receives the solicitation message along with the information needed for D2D communication.

Further, the method comprises of the relay UE transmitting a device discovery response along with a support status message to the remote UE based on the UE Id in the solicitation message. Based on the received solicitation message, the relay UE identifies whether D2D communication can be established with the remote UE or not. And based on the received information and identified values, the relay UE transmits the response to the remote UE along with the support status message indicating whether the communication can be established or not.

In an embodiment of the present invention, the relay UE transmits the device discovery response based on at least one of, but not limited to, QoS/latency bounds supportable or not, checking if Energy consumption is within threshold for Relay UE if admitting the soliciting remote UE with its Tx_Pwr, number of currently serving remote UEs is under limit, remote UE device type, Bandwidth, and the like, without departing from the scope of the invention.

According to another embodiment of the present invention, a method for discovering User Equipment (UE) over side link in device to device (D2D) communication, the method comprises steps of receiving, by a relay User Equipment (UE), a solicitation message from a remote User Equipment (UE), wherein the solicitation message comprises of an UE identity (Id), QoS Requirement, DRX configuration signals, current transmission power (Tx Pwr), and the like, wherein the QoS requirement can include, but not limited to, packet delay budget/latency bound, without departing from the scope of the invention.

Further, the method comprises of responding in Solicitation response message with an overload indication, if the relay load status is overloaded. If the relay UE identifies that the relay overload status of the remote UE is overloaded, then the relay UE transmits the solicitation response message to the remote UE with an indication of overload in the message.

In an embodiment of the present invention, in a Type 2 Discovery, the Relay UE responds in Solicitation response message with an overload indication and/or back-off indication or back-off duration value.

In an embodiment of the present invention, if the QoS requested by the remote UE is not supported by the Relay UE, then the Relay UE indicates the support status as negative.

According to an embodiment of the present invention, a method for discovering User Equipment (UE) over side link in device to device (D2D) communication, the method comprises steps of a relay UE checking QoS information in a solicitation message received from one or more remote UEs, wherein the QoS information comprises of latency bounds. The remote UE transmits solicitation message to the relay UE along with QoS information that comprises of latency bounds. The relay UE receives the solicitation message and checks for the QoS information.

Further, the method comprises of scheduling one or more service and remote UE transmissions in priority order based on a latency requirements of the one or more remote UEs. Based on the latency requirements of the one or more remote UEs, one or more services and remote UE transmissions can be scheduled.

Further, the method comprises of relay UE preparing receiving (RX) scheduling patterns based on the latency requirements. Further, the method comprises of assigning the RX scheduling patterns to the one or more remote UEs with aligning DRXs between relay and one or more remote UE(s).

According to another embodiment of the present invention, a method for enabling side link relay discovery in device to device (D2D) communication, the method comprises steps of receiving, by one or more relay User Equipment's (UE), a solicitation message transmitted by an in-coverage remote User Equipment (UE). In the present embodiment, the remote UE is in the coverage region of one or more relay UEs, and transmits solicitation message to the one or more relay UEs. The relay UEs receives the solicitation message transmitted by the remote UE.

Further, the method comprises of one or more relay UEs, which are currently overloaded, transmits a solicitation response message in Type 2 discovery. Further, the method comprises of the one or more relay UEs which are currently overloaded transmit an announcement message along with an overload indication in Type 1 discovery.

In an embodiment of the present invention, the method further comprises steps of transmitting, by the one or more Relay UEs, an overload indicator during a Master Information Block (MIB) broadcast indicating whether the UE relay is overloaded or not. During transmitting the solicitation response, the one or more relay UEs transmit overload indicator during the master information block (MIB) broadcast that indicates whether the relay UE is overloaded or not. Further, the method comprises of the one or more out of coverage remote UEs avoiding sending of the Solicitation Request message to the one or more relay UEs which are overloaded.

In another embodiment of the present invention, the method further comprises of backing off, by the one or more remote UEs, from sending the solicitation request message on receiving the overload indicator from the relay UEs, wherein the back-off duration is pre-provisioned to be selected from a predefined range.

According to another embodiment of the present invention, a method for enabling side link relay discovery in device to device (D2D) communication, the method comprises steps of receiving, by a relay User Equipment (UE), a DRX configuration request from a remote User Equipment (UE) over a PC-5 link. The remote UE transmits the DRX configuration request to the relay UE over the PC-5 link.

Further, the method comprises of based on the received DRX configuration request, the relay UE determines an optimal DRX configuration for the remote UE. Further, the method comprises of the relay UE sending the DRX configuration to the remote UE over the PC5 link and ensures no data is transmitted to the remote UE during the DRX period.

In an embodiment of the present invention, the DRX configuration request comprises of, but not limited to, a state indicator, DRX parameters, and the like, without departing from the scope of the invention.

In another embodiment of the present invention, the remote UE applies both Unicast and side-link DRX configuration to determine an active DRX period. In another embodiment of the present invention, the Relay UE determines optimal DRX configuration based on one of, but not limited to, alignment for DRX configuration used by the Remote UE and the Relay UE, based on services and their corresponding scheduling information, providing same DRX config as its own or a sub-set of it based on service needs, QoS/latency bounds, and the like, without departing from the scope of the invention.

According to another embodiment of the present invention, a method for enabling side link relay discovery in device to device (D2D) communication, the method comprises steps of receiving, by a relay User Equipment (UE), a data set from a network. The network transmits the dataset to the relay UE. Further, the method comprises of the relay UE performing data aggregation which is in accordance to the acceptable transmission delay for the concerned data. Further, the method comprises of performing, by the relay UE, a data transmission to a remote UE according to the configured DRX. Further, the method comprises of receiving, by the relay UE, data transmitted by the remote UE according to the configured DRX.

In an embodiment of the present invention, the Relay UE utilizes the QoS (latency bounds) information received from the Remote UE in deciding how much aggregation and transmission delay can be incurred at Relay UE side and scheduling transmissions for the remote UEs.

According to another embodiment of the present invention, method of disconnecting comprises steps of sending, by a relay UE, a disconnection request to a remote UE along with redirection information for switching of remote UE to another Relay User Equipment (UE). Further, the method comprises of receiving, by the relay UE, a disconnect response from the remote UE.

In an embodiment of the present invention, the relay UE acquires the redirection information based on at least one of, but not limited to, redirection information based on SIB19 which Out of Coverage Remote UEs can utilize, and the like, without departing from the scope of the invention. Here in, Redirection information in SIB19 provides list of side-link EARFCNs or frequencies which is used in the vicinity. Further, redirection information could be for switching form sidelink relay to LTE unicast connection in the case there is no proper or none other Relay UE is present in vicinity or not able to support the required service.

According to another embodiment of the present invention, a relay User Equipment (UE) for side-link communication, the relay UE comprises a Remote-Relay Controller (RR controller), a router module, a side-link stack, and an interface. According to the present invention, the Remote-Relay Controller (RR controller) is adapted for providing RX patterns assignment to remote UE(s) with aligning DRXs between relay and remote UE(s), traffic identification and differentiation, service data aggregation for remote UE(s), and QoS based scheduling transmission.

Further, the router module is adapted to connect a cellular link to a side-link with a L3 forwarding based approach. Further, the side-link stack is adapted for enabling communication with one or more remote User Equipment's (UEs) connected to the relay UE. Further, the interface technique is adapted for connecting the relay UE to the cellular network, wherein the network interface comprises at least one of a cellular Long-Term Evolution (LTE) network, Multicast-broadcast single-frequency network (MBSFN), wireless local area network (WLAN), and the like, without departing from the scope of the invention.

Figure 4:
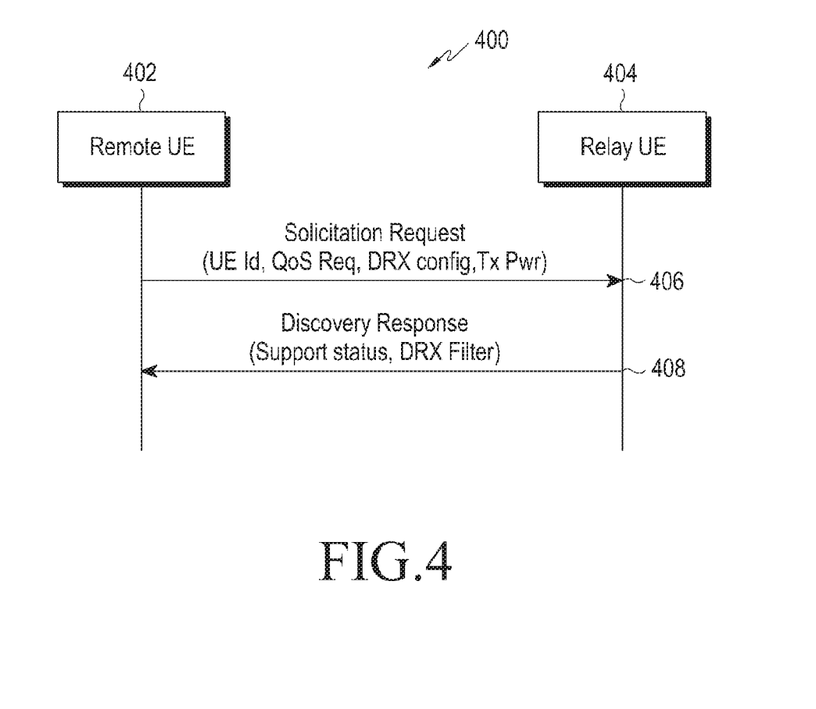
FIG. 4 is a schematic block diagram illustrating architecture for side-link Relay, according to an embodiment of the present invention.

FIG. 4 is a schematic flow diagram 400 illustrating a relay discovery approach, according to an embodiment of the present invention. According to the relay discovery approach as described in FIG. 4, the discovery approach for D2D communication is between a remote UE 402 and a relay UE 404. According to the embodiment, at step 406, the remote UE 402 sends a solicitation message in order to discover a Relay UE 404 to meet its desired service and includes one or combinations of information in the message including, but not limited to, UE identity, QoS Requirement i.e. packet delay budget/latency bound of the service, DRX configuration and state, such as, whether the remote UE is out of coverage or in idle DRX or connected DRX with some external network and the configuration for the DRX, its current transmission power with which it is transmitting the message to the Relay UE, and the like.

Remote UE 402 identification during discovery is performed with UE Id in Solicitation Request. Signaling type of device (Normal/wearable/V2X), type of interface, bandwidth (BW), uplink (UL)/downlink (DL) directions support and the like are encoded in prefix portion of UE Id. Remainder portion carries device identification. Based on identification, Relay UE 404 decides on support status and suitable configurations. Further UE Id is utilized during communication phase also wherein with the aid of UE Id network can distinguish the traffic packets coming from different Remote UEs and also from the traffic packets originated from the Relay UE. For this purpose the traffic packet carries the UE Id in the header of the packet. This also facilitates mapping of the packet across different bearers and links based on QoS requirements. Also in the reverse direction wherein packets are being received from network at Relay UE, they can be properly destined to the relay UE itself and towards different Remote UEs with suitable QoS priority for transmission based on the identification of UE_Id. In some cases, where same traffic is consumed by both Relay UE and one or more Remote UE(s), packets are copied and passed to both destinations instead of double decoding.

Further the UE_ID can be used or mapped to another suitable identification for paging purpose by the network to send a page indication to the Remote UE e.g. arrival of DL data or call.

QoS requirement is indicated in terms of latency bounds and/or QoS class identifier. DRX configuration (config) signals the idle/conn mode DRX and DRX parameters like DRX cycle etc. Relay device provides a DRX filter to remote device in order to conserve power and schedule its transmission. Tx Pwr is the transmission power used by the remote UE 402 for the message. Relay UE 404 determines the energy requirements based on this to support/add this remote device.

At step 408, the relay UE responds with support status based on such as, but not limited to, QoS/latency bounds supportable, Energy consumption within threshold for Relay UE if admitting the soliciting Remote UE with its Tx_Pwr, Number of existing being served Remote UEs under limit, Remote UE device type, BW, capability supportable and the like, without departing from the scope of the invention.

Since remote UE 402 is hidden to network, ensuring End-to-End QoS for the different services in a relay system is a challenge as can at most support QoS for the link between the network and the relay. The invention here proposes to ensure End-to-End QoS for service i.e. between the network and the remote UE 402 via the Relay UE 404. Approach includes both network assisted in which relay UE makes network aware about the specific need for QoS of a given service and network independent in which relay UE itself takes care to ensure desired QoS is achieved by taking scheduling and transmission operations accordingly to meet QoS as described ahead. It is possible to employ a combined approach in which both steps including that network is made aware and Relay UE 404 also undertakes steps and operations to ensure desired QoS is met for concerned services. These services can include different traffic types that include VOIP, streaming services, instant messaging, browsing, MTC traffic and download applications.

Further, the relay UE 404 utilizes the QoS (latency bounds) information received from Remote UE 402 in deciding how much aggregation (storing) and transmission delay can be incurred at Relay side and scheduling transmissions for Remote UEs 402. Different Services and Remote UEs 402 transmissions are scheduled in priority order in terms of their latency requirements. Accordingly DRX filters (RX scheduling patterns) are prepared and signaled to Remote UEs 402. Based on Traffic Differentiation Relay UE 404 employs different HARQ/RLC Profiling based to meet latency and reliability needs e.g. AM/UM mode, retransmissions etc. Additionally for persistent natured services, SPS/periodic scheduling is carried out. Alternatively, DRX configuration can be obtained by Relay UE from the network, after it informs network on the DRX requirements for the remote UE. Then Relay Ue provides the DRX configuration to the remote UE. With this approach network is also made aware about the DRx requirements on the sidelink and can help in the overall link operation from network through Relay UE to Remote UE efficiently. This approach also depends on the connected and idle mode of the UE. Also, the DRX configuration indication from network can be explicitly provided or indicated through an index to the preconfigured list of configurations or chosen by the Relay UE from the pool of DRx configurations.

Figure 5:
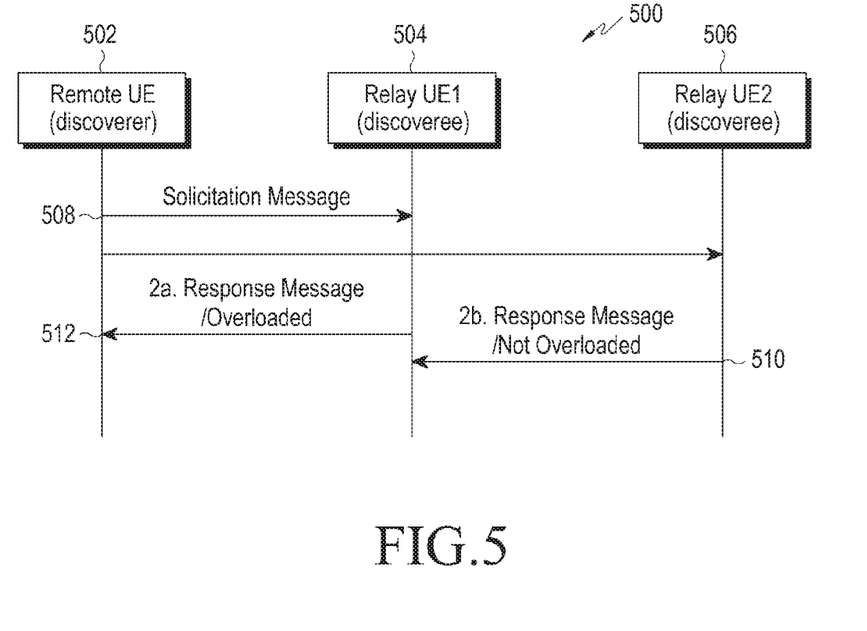
FIG. 5 is a schematic flow diagram illustrating a relay discovery approach, according to an embodiment of the present invention.

FIG. 5 is a schematic flow diagram 500 illustrating a discovery approach for overload case, according to an embodiment of the present invention. According to the FIG. 5, the diagram comprises of a remote UE 502 as discoverer, two relay UEs, relay UE1 504 and relay UE2 506 as discoveries (devices which are being discovered). At step 508, both the Relay UEs 504 and 506 in case of type-2 Discovery method, receives a solicitation request message from the Remote UE 502, and determines the Relay load status whether it is overloaded or congested i.e., already serving maximum possible Remote UEs and/or services. In the present case, relay UE1 504 is not overloaded and relay UE2 506 is overloaded. Thus, at step 510, the relay UE2 506 responds through the discovery response message with an overload indication and/or back-off indication or duration value for back-off. Further, at step 512, the relay UE1 504 responds through the discovery response message with not overloaded indication. In an embodiment of the present invention, in case of Type-1 Discovery method, the Relay UE1 504 transmits "Announcement" with overload indication. The Remote UEs, that are already connected to Relay, will ignore the Overload indication received in Announcement and perform PC5 measurements. But the Remote UEs that are not connected to Relay UE will process the Overload indication and act accordingly, and thus would not connect or reselect to these Relay UEs that are overloaded. Further, PC5 measurements are also abandoned for these Relay UEs.

Figure 6:
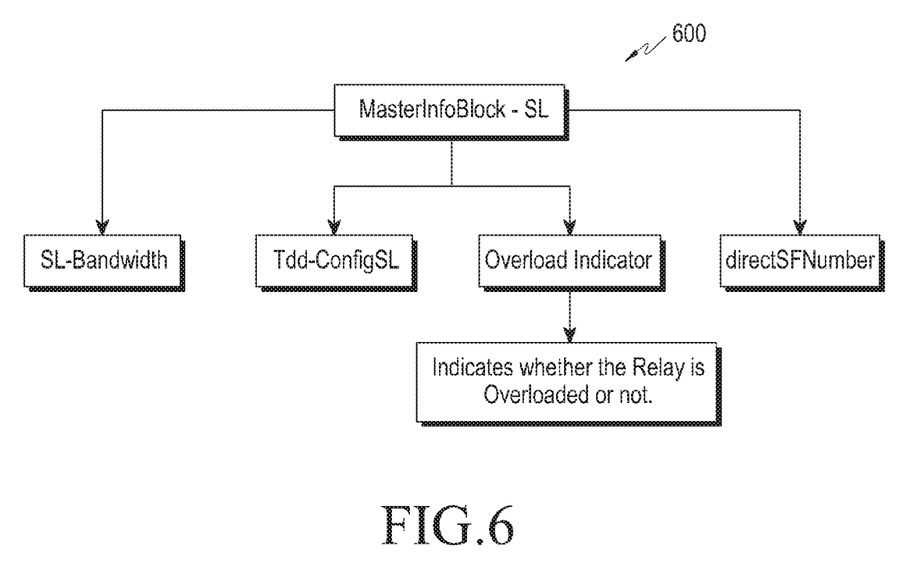
FIG. 6 is a schematic flow diagram illustrating a discovery approach for overload case, according to an embodiment of the present invention.

FIG. 6 is a schematic diagram 600 illustrating congestion handling, according to an embodiment of the present invention. According to the FIG. 6, in case of Out of Coverage Remote UE scenario, the Relay UEs advertise their Overload status during the MIB broadcast. An Out of Coverage Remote UE would first need to synchronize with Relay UEs before initiating the Discovery procedure, thus by including the Overload Status in MIB-SL the Relay UEs can avoid unnecessary Solicitation Request from Remote UEs thereby avoiding flooding at the Relay side and wastage of limited Discovery resources. Flooding is quite critical due to possibility of large number of remote UEs in the system causing redundant transmissions. Remote UEs, therefore, also avoid synchronizing to those relays that are overloaded.

An Out of Coverage Remote UE after decoding the MIB-SL of Relays would know if they are overloaded through the "Overload Indicator" and avoid sending Solicitation Request. Remote UEs can apply back-off and reattempt connecting to an Overloaded Relay UE; the back-off can either be explicitly broadcast by the Relay UE or pre-configured in the Remote UEs e.g. SIM can be preconfigured.

Figure 7:
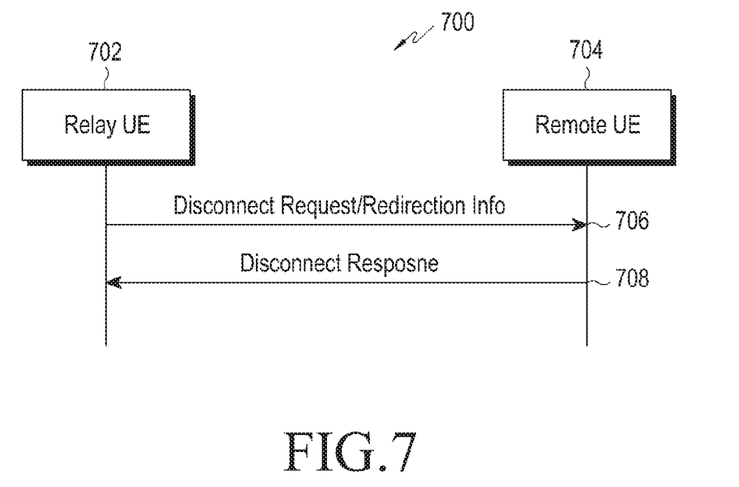
FIG. 7 is a schematic diagram illustrating congestion handling, according to an embodiment of the present invention.

FIG. 7 is a schematic flow diagram 700 illustrating redirection, according to an embodiment of the present invention. According to FIG. 7, the flow diagram 700 comprises of a relay UE 702 and a remote UE 704. if the Relay UE 702 needs to provide service for a higher priority Remote UE 704 or if the Relay UE 702 is being shut down or if the requested QoS of the remote UE 704 is not supportable by Relay UE 702, then the Remote UE 704 is redirected to search a different Relay UE 702 to get continued service or obtain its desired QoS service. At step 706, the Relay UE 702 can provide the Redirection Information in the Disconnect Request message. Upon receiving the message, at step 708, the remote UE 704 can transmit the disconnect response message to the relay UE 702 indicating if it is ready to disconnect from the relay UE 702 and ready to connect with another relay UE.

Figure 8:
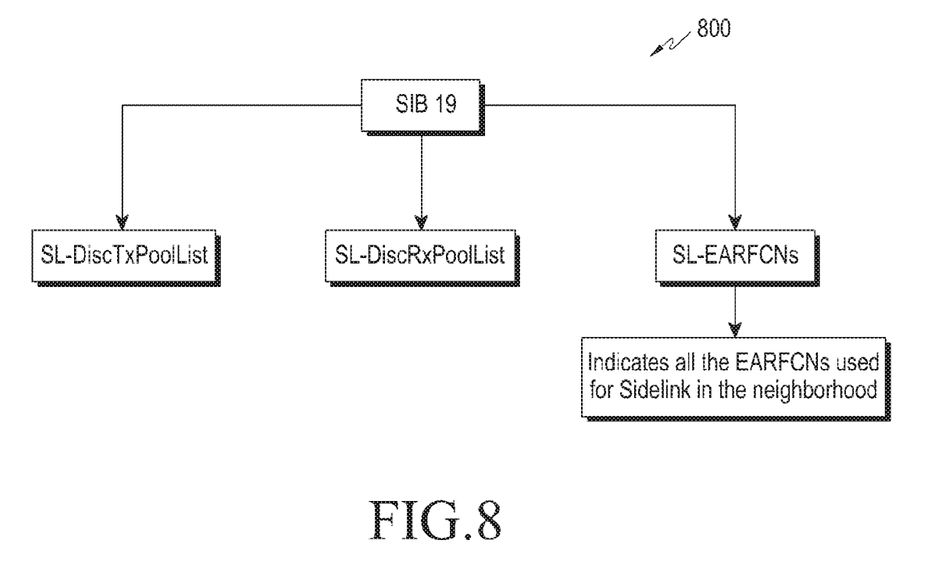
FIG. 8 is a schematic flow diagram illustrating redirection, according to an embodiment of the present invention.

FIG. 8 is a schematic diagram 800 illustrating approach for redirection, according to an embodiment of the present invention. According to FIG. 8, the Relay UE can acquire the Redirection information from the eNB. The eNB can broadcast the frequencies that are being used for sidelink in the vicinity via SIB 19. And the Relay UE can use the same frequencies received in SIB 19 in the Redirection information for the Remote UEs. Remote UEs which are not in coverage of network, therefore, can also obtain the information.

Furthermore, in an embodiment of the present invention, the system captures the aspect of differentiating different types of UE operating in side-link. In Rel.14 system, there would be different types of UEs and nodes that would be discovering for other UEs over the side-link, these include mobile devices, vehicles and road side units. As all these devices communicate using side-link resources (V2X scenario) it becomes necessary to differentiate among them. For example a normal mobile device would be interested to act as a Remote UE for Public Safety and not interested in interacting with vehicles or road side units.

Figure 9:
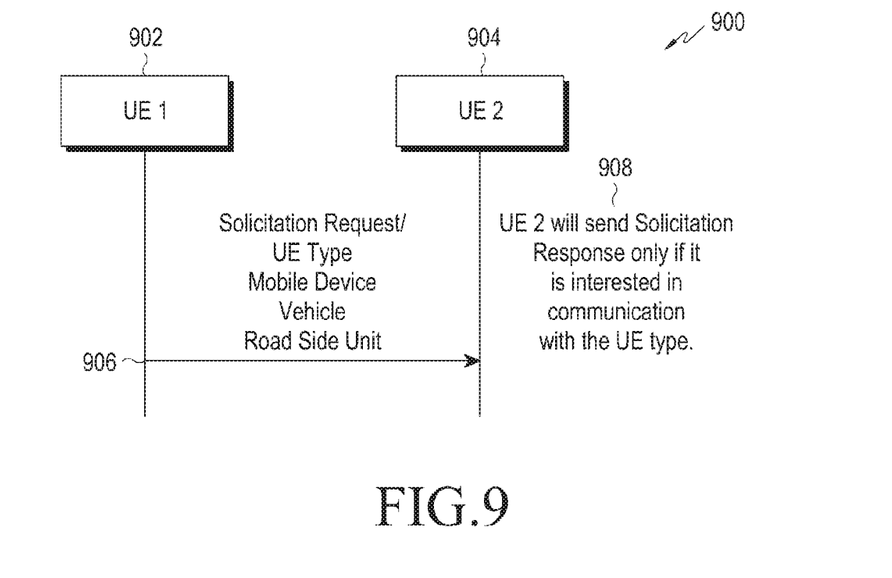
FIG. 9 is a schematic diagram illustrating approach for redirection, according to an embodiment of the present invention.

FIG. 9 is a schematic flow diagram 900 illustrating type-1 approach for discovery, according to an embodiment of the present invention. According to the FIG. 9, the flow diagram 900 comprises of two user equipment's (UE), UE1 902 and UE2 904. According to the FIG. 9, in Type-1 Discovery, at step 906, the UE1 902 that is making the Announcement would send a solicitation request that includes UE type. All the other devices, including UE 904, receives the Announcement, and at step 908, would initiate communication in the form of solicitation response message, only if it is interested in communicating with that particular UE type.

Figure 10:
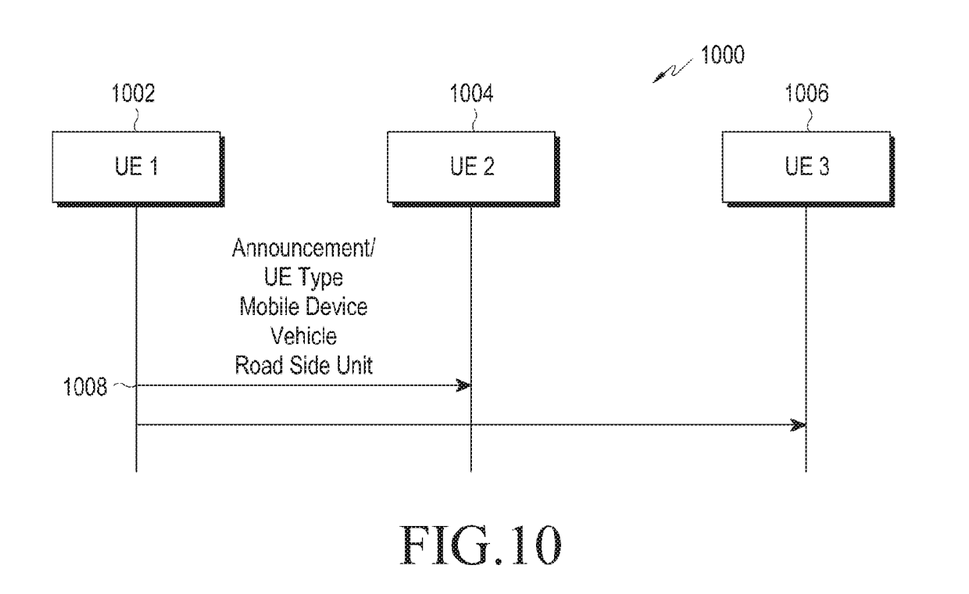
FIG. 10 is a schematic flow diagram illustrating type-2 approach for discovery, according to an embodiment of the present invention.

FIG. 10 is a schematic flow diagram 1000 illustrating type-2 approach for discovery, according to an embodiment of the present invention. According to the FIG. 10, the flow diagram 1000 comprises of three UEs, UE1 1002, UE2 1004, and UE3 1006. At step 1008, in Type-2 Discovery, the UE1 1002 being discoverer device will include its UE type in the Solicitation Request. All the other devices, UE2 1004 and UE3 1006, receiving the Request, would send a Solicitation Response, only if they are interested in communicating with that UE type.

Figure 11:
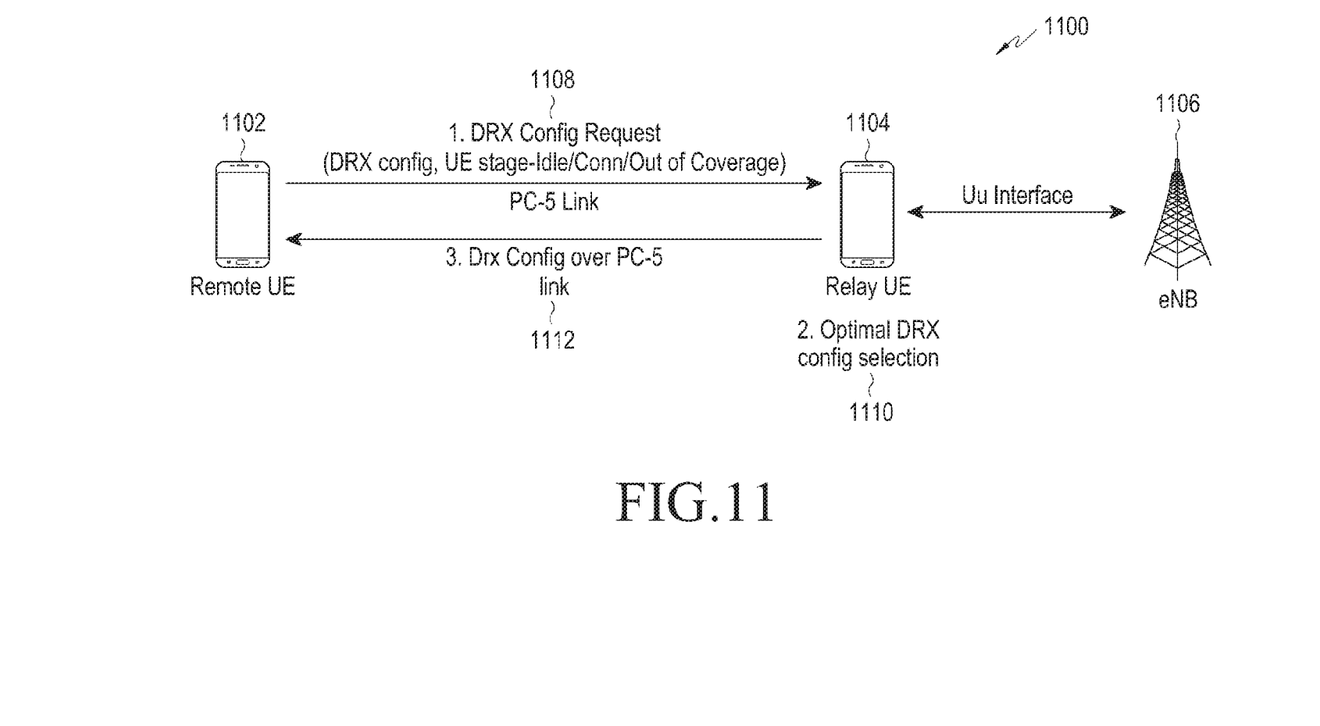
FIG. 11 is a schematic diagram illustrating type-1 discovery approach for V2X scenario, according to an embodiment of the present invention.

FIG. 11 is a schematic flow diagram 1100 illustrating approach for DRX, according to an embodiment of the present invention. According to the FIG. 11, the flow diagram 1100 comprises of a remote UE 1102, a relay UE 1104, and eNode (eNB) 1106.

For data reception, a remote UE needs to be awake and monitor entire Rx occasions which are a superset of all the relay Tx opportunities, even though data may not be scheduled always, causing poor DRX operation and heavy power consumption. At the same time, individual remote UEs may be under different configurations for Connected/Idle DRX with their own networks and have different QoS requirements for their services.

According to the FIG. 11, the Relay UE 1104, on the basis of latency bounds information and DRX configuration and state of Remote UE 1102, determines the DRX filter which is the subset of the RX occasions that will be utilized for Relay to Remote communication and indicates this DRX filter to Remote UE 1102 in Discovery Response message. While selecting this subset, consideration is given to choose such that selected subset is aligned with the DRX of remote UEs and/or Relay UE 1104. With better alignment with existing DRX patterns, power saving is boosted for both Relay and Remote UEs.

During communication phase, at step 1108, the Remote UE 1102 transmits its current state (Idle, Connected, Out Of Coverage or OOC) and unicast DRX configurations for connected state over the PC-5 link to the Relay UE 1104 and requests it to provide the Sidelink DRX configurations based on the parameters shared with the Relay UE 1104 thus far.

At step 1110, the Relay UE 1104 determines optimal DRX configuration based on multiple approaches—

1. Alignment of DRX configurations used in both Remote UE 1102 and Relay UE 1104,
2. By taking into account the QoS and latency requirements of the Remote UE 1102,
3. Providing same DRX configurations as its own or a subset of it based on service and scheduling needs.

Further, at step 1112, the relay UE 1104 sends the DRX configuration to remote UE 1102 over PC5 link and makes sure for no transmission during DRX period. Remote UE 1102 applies both Unicast and side-link DRX configuration to determine active period in conn mode. Based on state and service scheduling, DRX config/pattern can be dynamically updated.

Figure 12:
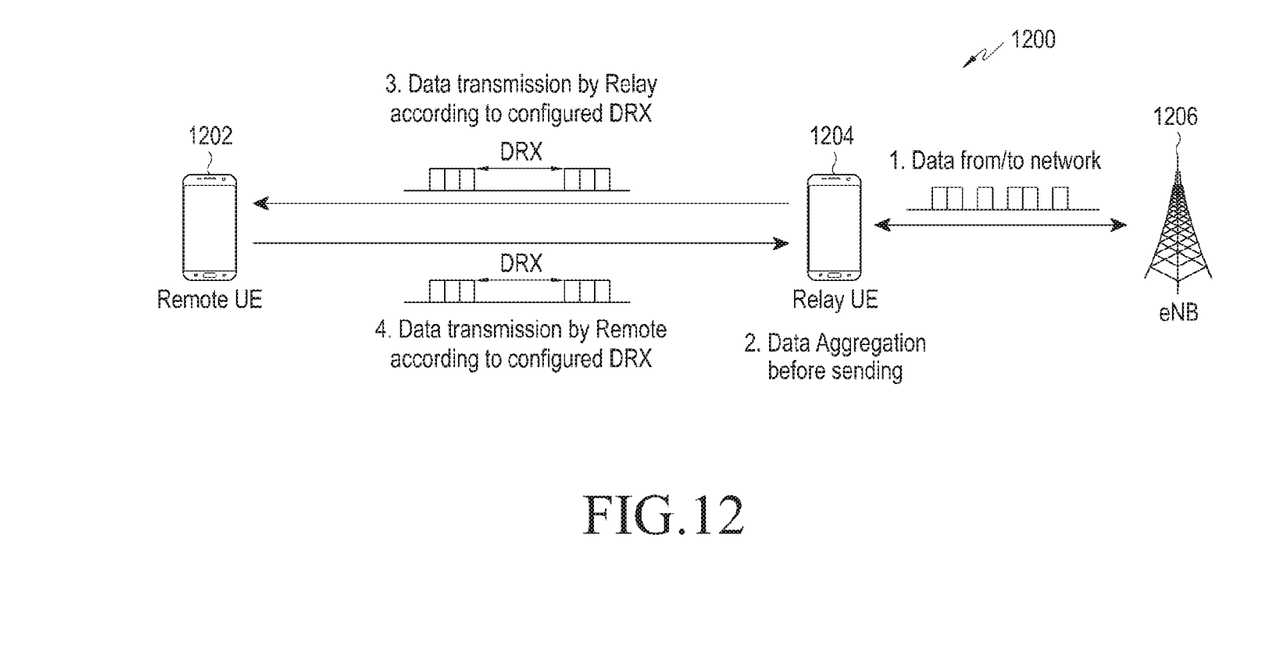
FIG. 12 is a schematic flow diagram illustrating approach for DRX, according to an embodiment of the present invention.

FIG. 12 is a schematic flow diagram 1200 illustrating approach for DRX and data aggregation, according to an embodiment of the present invention. According to the FIG. 12, the flow diagram 1200 comprises of a remote UE 1202, a relay UE 1204, and eNode (eNB) 1206. According to the flow diagram 1200, the relay UE 1204 aggregates service data which is received from main link (cellular, MBSFN etc) and stores temporarily until TX opportunities determined as per DRX alignment and QoS requirement is met and tries to maximize the power saving.

When transmission opportunities are met as per determination, the Relay UE 1204 undertakes burst mode of transmission to quickly send out the data towards the Remote UEs 1202. The Relay UE 1202 schedules transmission in priority order of service QoS for each of the remote UEs 1202 connected to it. This ensures the required service latency or packet delay budget is not overshoot for packets pertaining to the defined QoS. In another embodiment, it is described that the Relay UE provides the configuration for the TX/RX gaps information for side-link communication to remote UE 1202 through PC-5 link (side-link) so that the Relay UE 1204 and Remote UEs 1202 are in sync for TX and RX and saves power during non-transmission and no-reception periods (gaps).

Further, the Relay UE 1204 dynamically updates the configuration changes as applicable to Relay UE 1204 and Remote UE 1202 and iterative applies the scheduling algorithm as discussed to achieve best possible performance.

In another embodiment of the present invention, the Relay UE 1204 and Remote UE 1202 can be constituents of V2V (Vehicle to Vehicle) or V2X (Vehicle to Everything) communication system and services they carry may be public safety messages and/or traffic related alerts and/or infotainments services data etc.

In another embodiment of the present invention, the remote UE 1202 could be wearables and relay UE 1204 could be smartphones that form Relay-Remote communication system and can utilize LTE, D2D, Wireless LAN, Bluetooth, Machine Type Communication or Narrow Band communication to interact and transfer data across.

In another embodiment of the present invention, the Relay UE 1204 can be 5G devices and that aid to extend the 5G communication coverage to indoors environment wherein Remote devices located inside are not reachable with 5G communication. This is due to limitation of the millimeter waves to be used in 5G which are short range and suffers extreme high attenuation in propagating through certain building materials like bricks, concrete etc. and resultantly, renders 5G coverage to be limited to outdoors. The proposed Relay-Remote system can thus extend 5G communication to indoors and also extend its range of coverage.

Figure 13:
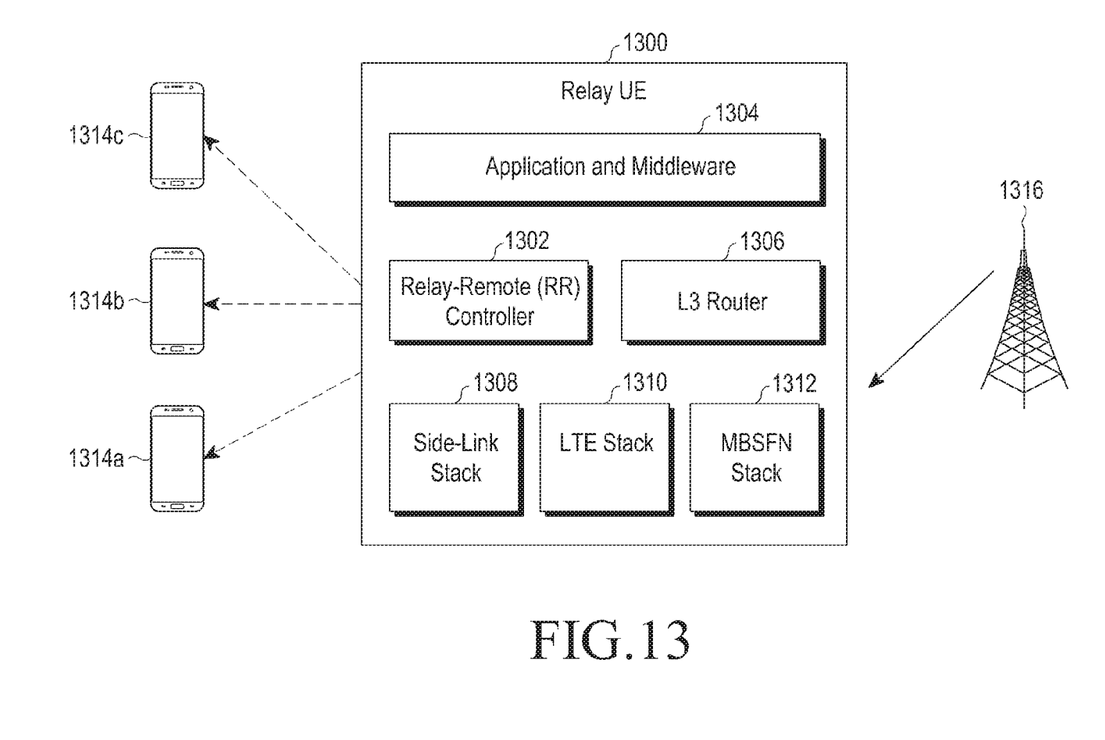
FIG. 13 is a schematic flow diagram illustrating approach for DRX and data aggregation, according to an embodiment of the present invention.

FIG. 13 is a schematic block diagram 1300 illustrating architecture for a relay UE 1300 with side-link Relay, according to an embodiment of the present invention. According to the FIG. 13, the relay UE 1300 comprises of a RR (Relay-Remote) Controller 1302, application and middleware 1304, a L3 router 1306, a sidelink stack 1308, a LTE stack 1310, and a MBSFN stack 1312. Further, the relay UE 1300 can be connected to one or more remote UEs remote UE1 1314a, remote UE2 1314b, remote UE3 1314c, and a cellular network 1316.

According to the present invention, the RR controller 1302 handles admission control through discovery process and employs communication scheduling strategies. The RR controller 1302 determines the scheduling transmission occasions towards remote UEs maximizing overall system energy efficiency, providing remote UEs operational DRX patterns for their sleep operation and meeting QoS requirements for pertinent public safety or broadcast services. Multiple stacks in the relay cater to reception capability through different cellular air interface techniques like side-link stack 1308, LTE stack 1310, MBSFN stack 1312, and the like. L3 Router module 1306 bridges the cellular link to side-link with a L3 forwarding based approach. Side-link communication serves to one or more remote UE(s) connected with the relay.

Proposed functionalities of the RR controller 1302 are: a) RX patterns assignment to remote UE(s) with aligning DRXs between relay and remote UE(s), b) Traffic identification and differentiation, c) Service Data aggregation for remote UE(s), and d) QoS based scheduling transmission. RR controller 1302 employs common buffer for service data aggregation with suitable indexing and identification of services while rendering differential treatment based on QoS requirements. This is applied in both directions viz. downlink and uplink. Mapping is maintained between side-link services and cellular link bearers and also involves priority handling and sending data based on QoS needs e.g. delay sensitive data is provided at earliest for transmission.

In an embodiment of the present invention, a state machine is proposed for side-link Relay. State machine for Relay operation includes following states: Sleep state—where in Relay UE 1300 remains in DRX sleep, Aggregation state—where in Relay UE 1300 only receives data and does not transmit. Therefore it accumulates and aggregates the data pertaining to one or more remote UEs 1314a, 1314b, 1314c, Sidlelink_TX state—wherein Relay UE 1300 undertakes only transmission on side-link but does not receive data. Therefore, the Relay UE 1300 can transmit the data aggregated previously in aggregation state in burst mode, and Relaying state—wherein Relay UE 1300 undertakes simultaneous reception and transmission of the data on the main link (cellular link) and side-link. Therefore, aggregation factor is defined for a given service and is dependent on service QoS bound, average sleep delay for Relay, and further constrained by DRX alignment to assign optimum DRX cycle length and to select those Rx opportunities meeting awake period of DRX cycle. DRX alignment also considers the DRX pattern, remote UE may be already subjected to under its own network. Therefore, aggregation factor determines how much data aggregation is carried out at Relay UE before transmitting packet towards Remote UE.

According to another embodiment of the present invention, both Mode 1 and Mode 2 resource scheduling need to be governed by the relevant service QCI requirement for the Remote UE e.g. for VOIP/emergency calls. In view of the present invention, when Remote UE is not in RRC connected state, the Relay UE takes up the scheduling of the resources based on the service QoS requirements e.g. semi-persistent or dynamic scheduling based on service nature.

According to an embodiment of the present invention, the QoS satisfaction is tightly intermingled with DRX operation and though they, in general, seem inversely related i.e. better DRX/EE leads to poor QoS or vice versa; The embodiments of the present invention discloses a method to jointly optimize both these parameters. It determines the following conditions for scheduling decisions in a DRX situation:

Remaining active time after which remote UE would undergo for DRX

When remote UE is already in DRX, how much DRX time remaining before waking up again and having scheduled transmission opportunity Accordingly, new parameters which consider the prioritization of scheduling for remote UE which is about to go for DRX and DRX state of concerned remote UE when service data emerges for transmission towards it. This enables ensuring quick delivery and avoiding packet loss.

According to another embodiment of the present invention, the process comprises of raising the priority of the service for remote UE which is just about to go to DRX instead of applying a continuous function of remaining active time unlike as discussed earlier. That is, at the last scheduling event post which a particular remote UE would go to DRX, its DRX sleep period is added to its delay while evaluating the scheduling decision. Effectively, considered delay is obtained by adding the DRX delay to the queued packet delay at the immediate last scheduling event before a particular remote UE goes into DRX.

Since relay is intermediate transmitter, invention further proposes to have discard functionality at relay where it determines the potential delay and discards packet when it is not feasible to satisfy packet delay budget, saving on the wastage of transmission resources.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

The invention claimed is:

1. A method for discovering user equipment (UE) over a side link in device to device (D2D) communication, the method comprising:
   receiving, by a relay UE, a solicitation message from a remote UE, the solicitation message comprising first information including one or more of an UE identity, QoS information, a DRX configuration signal or a current transmission power;
   scheduling, by the relay UE, a transmission based on a priority order, the priority order being based on the first information; and
   transmitting, by the relay UE, a device discovery response with a support status message to the remote UE based on the UE identity.

2. The method of claim 1, wherein the transmitting transmits the device discovery response based on at least one of:
   latency bounds corresponding to the QoS information being supportable;
   energy consumption being within a threshold;
   a number of currently served remote UEs being under a limit;
   a device type of the remote UE; or
   a bandwidth.

3. The method of claim 1, further comprising:
determining, by the relay UE, whether a relay load status is overloaded or congested, the remote UE being in a coverage area of the relay UE.

4. The method of claim 3, further comprising:
transmitting, by the relay UE, a solicitation response message with an overload indication based on the relay load status being overloaded.

5. The method of claim 4, wherein the support status message indicates as negative based on a QoS corresponding to the QoS information not being supported by the relay UE.

6. The method of claim 1, further comprising:
checking, by the relay UE, the QoS information.

7. The method of claim 6, wherein the scheduling schedules one or more transmissions in the priority order based on latency information of the remote UE.

8. The method of claim 7, further comprising:
preparing RX scheduling patterns based on the latency information.

9. The method of claim 8, further comprising:
assigning the RX scheduling patterns to the remote UE including aligning DRXs between the relay UE and the remote UE.

10. A relay user equipment (UE) for side-link communication comprising:
at least one communication circuit, and
at least one processor, wherein the at least one processor is configured to:
receive a solicitation message from a remote UE, the solicitation message comprising first information including one or more of an UE identity, QoS information, a DRX configuration signal or a current transmission power;
schedule a transmission based on a priority order, the priority order being based on the first information; and
transmit, via the at least one communication circuit, a device discovery response with a support status message to the remote UE based on the UE identity.

11. The relay UE of claim 10, wherein the at least one processor is configured to determine whether a relay load status is overloaded or congested, the remote UE being in a coverage area of the relay UE.

12. The relay UE of claim 11, wherein the at least one processor is configured to transmit a solicitation response message with an overload indication based on the relay load status being overloaded.

13. The relay UE of claim 12, wherein the support status message indicates as negative based on a QoS corresponding to the QoS information not being supported by the relay UE.

14. The relay UE of claim 10, wherein the at least one processor is configured to check the QoS information.

15. The relay UE of claim 14, wherein the at least one processor is configured to schedule one or more transmissions in the priority order based on latency information of the remote UE.

16. The relay UE of claim 15, wherein the at least one processor is configured to prepare RX scheduling patterns based on the latency information.

17. The relay UE of claim 16, wherein the at least one processor is configured to assign the RX scheduling patterns to the remote UE including aligning DRXs between the relay UE and the remote UE.

18. The relay UE of claim 16, wherein the at least one processor is configured to transmit the device discovery response based on at least one of:
latency bounds corresponding to the QoS information being supportable;
energy consumption being within a threshold;
a number of currently served remote UEs being under a limit;
a device type of the remote UE; or
a bandwidth.

19. A method for enabling side link relay discovery in device to device (D2D) communication, the method comprising:
receiving, by one or more relay user equipment's (UEs), a solicitation message transmitted by a remote UE;
scheduling, by a first relay UE among the one or more relay UEs, a transmission based on a priority order; and
transmitting, by each respective relay UE among the one or more relay UEs, a solicitation response message to the remote UE, the solicitation response message comprising an overload status indicating whether the respective relay UE is overloaded.

20. The method of claim 19, further comprising:
transmitting, by each respective relay UE among the one or more relay UEs, an overload indicator during a master information block (MIB) broadcast indicating whether the respective UE relay is overloaded.

* * * * *